April 25, 1939.  W. F. WESTENDORP  2,156,074
ENERGIZING CIRCUIT FOR UNILATERALLY CONDUCTING DEVICES
Filed Feb. 1, 1938  2 Sheets-Sheet 1
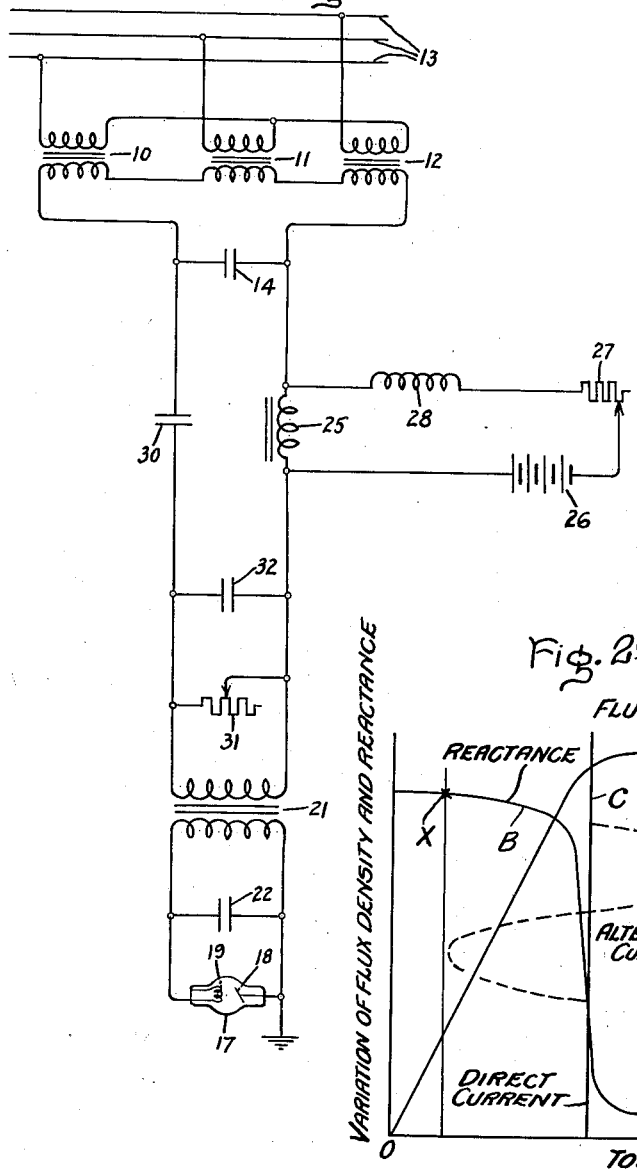
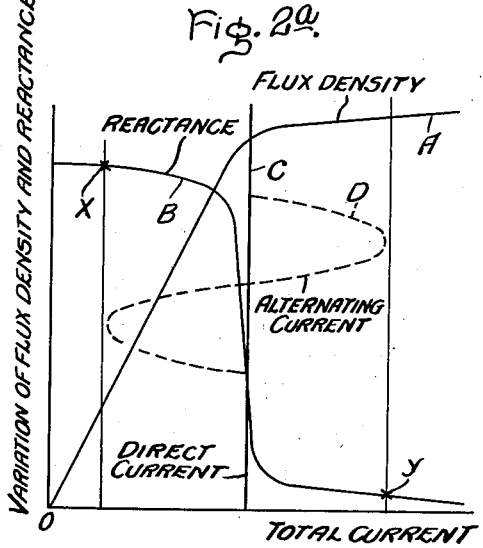
Inventor:
Willem F. Westendorp,
by Harry E. Dunham
His Attorney.

April 25, 1939.　　W. F. WESTENDORP　　2,156,074
ENERGIZING CIRCUIT FOR UNILATERALLY CONDUCTING DEVICES
Filed Feb. 1, 1938　　2 Sheets-Sheet 2

Inventor:
Willem F. Westendorp,
by Harry E. Dunham
His Attorney.

Patented Apr. 25, 1939

2,156,074

UNITED STATES PATENT OFFICE 2,156,074

ENERGIZING CIRCUIT FOR UNILATERALLY CONDUCTING DEVICES

Willem F. Westendorp, Schenectady, N. Y., assignor to General Electric Company, a corporation of New York Application February 1, 1938, Serial No. 188,097

4 Claims. (Cl. 250—102)

The present invention relates to an improved energizing circuit for unilaterally conducting devices. While not limited thereto, it is especially applicable in connection with self-rectifying X-ray devices.

In connection with the energization of a self-rectifying X-ray tube or the like the inverse voltage appearing across the tube during its non-conducting periods tends to exceed the useful voltage which appears across the tube during conducting periods. This phenomenon is primarily due to the voltage drop which occurs during periods of useful current flow as a result of the series impedance of the voltage transformer and other elements of the supply circuit. Since this drop does not exist to the same degree during the non-conducting periods, the inverse voltage may be considerably higher than the useful voltage. This excessive inverse voltage is undesirable from a practical standpoint in that it makes it necessary to insulate the tube for a higher voltage than would otherwise be required.

It is an object of the present invention to provide an effective and inexpensive means for selectively diminishing the inverse voltage impressed on an X-ray tube or other unilaterally conducting load device during its non-conductive periods. In accordance with one embodiment of the invention this is accomplished by connecting in circuit with the supply source and the load device a bi-laterally conducting impedance element which is adapted to increase its impedance during non-conductive periods of the load device.

Figure 2:
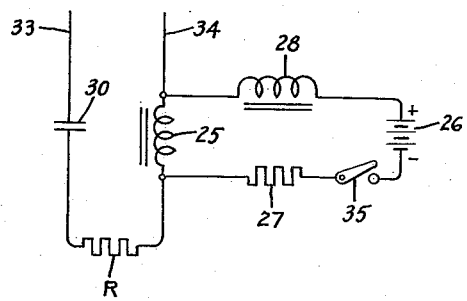

The features of the invention which I desire to protect herein are pointed out with particularity in the appended claims. The invention itself together with further objects and advantages thereof will best be understood by reference to the following description taken in connection with the drawings in which Fig. 1 illustrates diagrammatically an X-ray tube energizing circuit which typically embodies the invention; Fig. 2 is a simplified circuit useful in explaining the invention, and Figs. 2a, 3, 4, and 5 are graphical representations which also serve to simplify the explanation.

Referring particularly to Fig. 1, the energizing circuit there illustrated includes a frequency tripling apparatus, although such apparatus is not a necessary part of my invention. This apparatus, which is of a known type, includes three transformers 10, 11 and 12 having their primaries connected in Y to a source of three-phase alternating voltage 13, and their secondaries connected in open delta. If the transformers are operated in a condition of at least partial saturation, an alternating voltage having a frequency three times the fundamental frequency of the supply source 13 will appear across the terminals of the open delta secondary connection. A condenser 14 bridged across the secondary terminals serves to offset the inductive reactance of the system and to increase the possible power output.

The load circuit shown connected to the frequency tripler comprises a self-rectifying X-ray tube 17 having an anode 18 and a thermionic cathode 19. In order that the voltage impressed across the terminals of the tube may be sufficiently high to result in the production of X-rays a voltage transformer 21 is interposed between the supply source and the tube. The secondary circuit of the transformer may, if desired, be tuned to partial or complete resonance by capacitance connected across the tube 17 as indicated by the condenser 22. This condenser may be taken to represent the inherent shunt capacitance of the X-ray apparatus plus whatever additional capacitance may be applied to produce the desired degree of tuning.

As previously explained, with an energizing circuit such as that so far described the inverse voltage appearing across the X-ray tube 17 will be substantially in excess of the useful voltage appearing across the tube during its conducting periods. In order to overcome this difficulty in accordance with the invention there is provided in series with the transformer primary an inductance element characterized by a non-linear reactance which tends inherently to decrease during conducting periods of the X-ray device and to increase during the non-conducting periods of such device. This may be provided, for example, in the form of a saturable core reactor 25 having means for assuring a high degree of saturation of said core during the conducting periods of the X-ray tube and a lesser degree of saturation during its non-conducting periods.

A simple arrangement for accomplishing the desired operation is illustrated as comprising a battery or other source of direct current 26 connected across the reactor 25 through a regulating resistor 27 and a non-saturating inductance 28. The latter element serves to prevent the flow of alternating current in the battery circuit, while the flow of direct current in the X-ray tube energizing circuit is prevented by means of a series condenser 30. A variable resistance 31 connected across the primary of the transformer 21 makes it possible for at least some current to flow at all times in the energizing circuit and for the voltage appearing across the transformer terminals to be regulated in a desired manner. The wave form of this voltage may be somewhat improved by the use of a condenser 32 connected in shunt with the transformer primary as shown.

The operation of the circuit elements described in the foregoing may best be understood by reference to Fig. 2 which shows the inverse voltage suppressing elements in a simplified relationship. In this figure, parts corresponding to those already described are similarly numbered. The load circuit is represented, however, by a resistor R. It will be understood that the terminals 33 and 34 of the circuit shown are connected to a source of alternating voltage such as that described in connection with Fig. 1.

Figure 3:
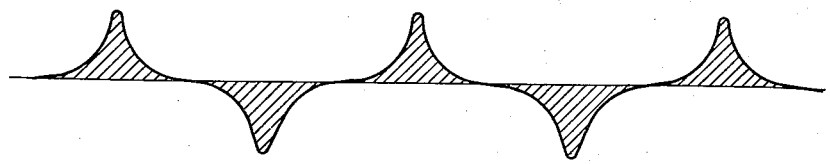

With the direct current circuit open as shown, the reactor 25 may be considered as a symmetrical impedance; that is, the impedance which it offers to current flowing in one direction is precisely the same as that which it offers to current flowing in the other direction. Consequently, the voltage appearing across the resistor R will be symmetrical as indicated in Fig. 3. (The non-sinusoidal form of the voltage curve shown in this figure is a result of the distorting effect produced by saturation of the reactor.)

If some direct current is impressed on the reactor 25 by closing the switch 35, a constant degree of saturation will be obtained in the reactor as a result of the uni-directional current flow through it. The effect of this current will obviously be additive to that of one-half wave of the alternating current flowing through the reactor and subtractive with respect to the other half wave. This point may be clarified by reference to Fig. 2a, in which the curve A is representative of the manner in which the flux density in the core of the reactor varies with the total current flowing in the reactor winding. Curve B shows the corresponding variation of the reactor impedance. Since this latter quantity is a function of the slope of the flux density curve, it is clear that it will have a high value as long as the reactor is operated below the knee of the curve and a low value as soon as a point above the knee of the curve is reached.

For the use contemplated, the direct current supplied to the reactor is preferably such as to cause it to operate normally at a point close to the knee of the curve, as indicated, for example, by the line C of Fig. 2a. Under these circumstances, when an alternating current D is superimposed on the direct current, the reactor is caused to vary from a condition of low saturation to a condition of high saturation. Concurrently, the impedance of the reactor varies from a high value $x$ to a low value $y$.

Figure 4:
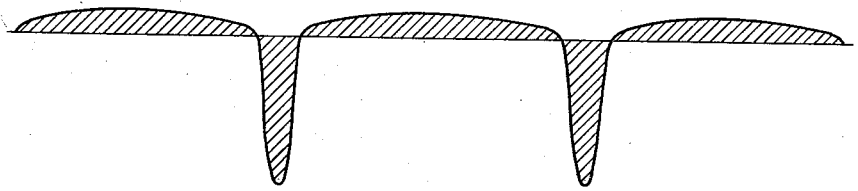
Figure 5:
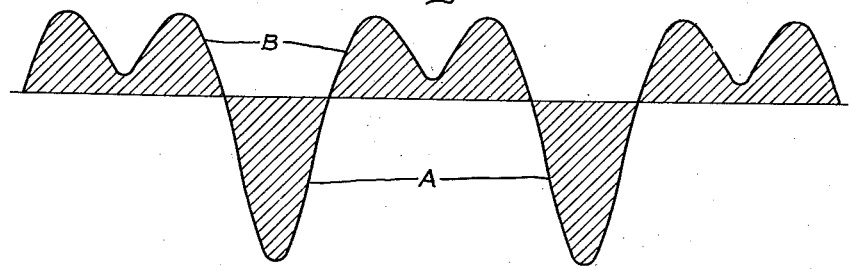

Fig. 4 shows the effect of these variations in reactor impedance on the voltage appearing across the resistor R. It will be seen in this figure that the voltage appearing across the resistor during certain half cycles may be appreciably in excess of that appearing during the alternate half cycles. If the resistor R is now replaced by a load circuit comprising a transformer, a unilaterally conducting load device and a capacitance, respectively, correspoding to the elements 21, 17 and 22 of Fig. 1, the voltage impressed on the load device will be further modified as is indicated in Fig. 5. (The appearance of the second harmonic which characterizes the voltage wave shown is primarily a result of the presence of the capacitance 22.) With the elements of the circuit properly adjusted, the magnitude of the parts A of the voltage wave which correspond to the useful half waves of voltage may be made as much as 1½ to 2 times that of the parts B which correspond to the half waves of inverse voltage impressed across the device during its non-conducting periods. Consequently, the insulation of the device and its associated parts need be made only sufficient to accommodate the useful voltage.

While I have described the invention especially in connection with an X-ray device, it is equally applicable to other unilaterally conducting load devices which are adapted to be operated at high voltage. Furthermore, while I have shown a particular embodiment of the invention, it is apparent that many modifications may be made by those skilled in the art without departing from the invention. I, therefore, aim in the appended claims to cover all such equivalent variations as come within the true spirit and scope of the foregoing disclosure.

What I claim as new and desire to obtain by Letters Patent of the United States is:

1. In combination, a unilaterally conducting load device, a source of alternating voltage for energizing the device, and means for selectively diminishing the voltage impressed on the device during its non-conductive periods, said means including a saturable core reactor in circuit with the said source and device and means for assuring a high degree of saturation of said core during conducting periods of the device and a lesser degree of saturation during non-conducting periods thereof.

2. In combination, a unilaterally conducting load device, a source of alternating voltage for energizing the device, and means for selectively diminishing the voltage impressed on the device during its non-conductive periods, said means including a saturable core reactor in circuit with the said source and source of unidirectional current for producing at least partial saturation of said core, the effect of said unidirectional current being additive to that of the current flowing from the source to the reactor during conducting periods of the load device and being subtractive from that of the current flowing to the source during non-conducting periods of the device.

3. In combination, a self-rectifying X-ray device, a source of alternating voltage for energizing the device, a high voltage transformer having its secondary in circuit with the X-ray device and its primary in circuit with said source, and means for selectively diminishing the voltage impressed on the device during its non-conductive periods, said means including a saturable core reactor in circuit with the primary of the transformer and means for assuring a high degree of saturation of said core during conducting periods of the device and a lesser degree of saturation during non-conducting periods thereof.

4. In combination, a unilaterally conducting load device, a source of alternating current for energizing the load device, and voltage-consuming means interposed between the said source and load device for selectively diminishing the voltage applied to the load device during its non-conductive periods, the said means including a saturable core reactor, a source of direct current for partially saturating the core of the reactor, and means for causing the degree of saturation of the reactor to vary cyclically and materially in time with the variations of the said alternating voltage.

WILLEM F. WESTENDORP.